United States Patent [19]

Deckert et al.

[11] 4,110,816
[45] Aug. 29, 1978

[54] INSTALLATION OF ELECTRICAL COMPONENTS, PARTICULARLY SOLID ELECTROLYTIC CAPACITORS IN METAL HOUSINGS

[75] Inventors: Andreas Deckert, Ellwangen-Schrezheim; Hans Wolscheck, Hermaringen, both of Germany

[73] Assignee: Siemens Aktiengesellschaft, Berlin & Munich, Germany

[21] Appl. No.: 736,422

[22] Filed: Oct. 28, 1976

[30] Foreign Application Priority Data

Dec. 18, 1975 [DE] Fed. Rep. of Germany ....... 2557201

[51] Int. Cl.² .............................................. H01G 9/00
[52] U.S. Cl. ................................... 361/433; 174/52 S

[58] Field of Search ......................... 317/230; 29/570; 174/52 S, 50.51, 50.52, 50.53; 361/433; 228/175, 179, 187

[56] References Cited

U.S. PATENT DOCUMENTS 3,337,429  8/1967  Zind .................................. 317/230 X

FOREIGN PATENT DOCUMENTS 897,490  5/1962  United Kingdom .................. 174/52 S Primary Examiner—Stanley D. Miller, Jr.
Assistant Examiner—James W. Davie
Attorney, Agent, or Firm—Hill, Gross, Simpson, Van Santen, Steadman, Chiara & Simpson

[57] ABSTRACT

A solid electrolytic capacitor is installed in a non-solderable aluminum housing by providing a solderable metal part which is welded to the base of the aluminum housing. Subsequently the capacitor is soldered to this metal part via a solder filler and thereby to the housing.

7 Claims, 2 Drawing Figures

INSTALLATION OF ELECTRICAL COMPONENTS, PARTICULARLY SOLID ELECTROLYTIC CAPACITORS IN METAL HOUSINGS

BACKGROUND OF THE INVENTION

1. Field of the Invention

This invention concerns electrical components which are mounted in metal housings, and in which one electrical terminal of the component is connected to the housing by means of a soft solder.

2. Description of the Prior Art

Solid electrolytic capacitors consist of a sintered body of a valve metal such as tantalum or niobium onto which the oxide layer serving as the dielectric is applied by means of anode oxidation. In such capacitors, a semiconducting electrolyte serves as a cathode, such as manganese or lead oxide. For the cathode current terminal a graphite layer is generally used which is located on the electrolyte. The graphite layer is covered by a solderable coating, such as a layer of silver conductive lacquer. When installed in metal housings, the electrical connection is produced by means of solft soldering between the cathode current terminal and the housing. An anode connecting wire is guided out of the housing in an insulated fashion. This manner of installation presupposes a housing of a solderable metal or a solderable metal alloy such as copper. But solderable metals of this type are expensive and most often also require a surface treatment to protect against corrosion.

SUMMARY OF THE INVENTION

An object of this invention is to provide a component element which is mounted in a metallic housing wherein the difficulties mentioned above do not occur.

According to the invention, the above objective is met by providing the housing as an aluminum or an aluminum alloy, and wherein a solderable metal part is welded to the housing.

According to a further development of the invention, the housing is an aluminum cup and the solderable metal part is welded to the base of the cup.

By use of the invention, significantly cheaper aluminum may be used for the housings and a solderable installation of the component is nevertheless guaranteed. It must be emphasized that aluminum housings do not require any surface treatment to protect against corrosion.

In an inventive method for producing an electrical component of the type initially described, a metal housing of aluminum or aluminum alloy is provided. A solderable metal part is welded to the housing. The housing is filled with soft solder. The solder is liquefied. The electrical terminal of the component which is to be connected to the housing is dipped into the solder. Finally, the housing is sealed in known fashion after cooling of the solder.

DESCRIPTION OF THE PREFERRED EMBODIMENTS

Figure 1:
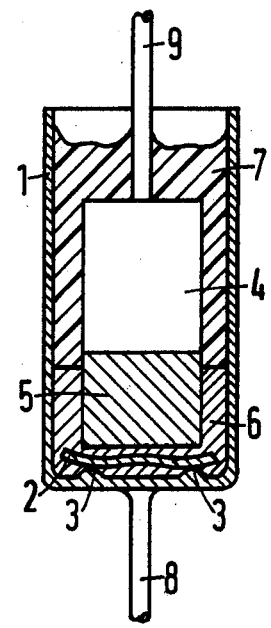
FIG. 1 illustrates a solid electrolytic capacitor mounted in a housing which is sealed with a sealing resin.
Figure 2:
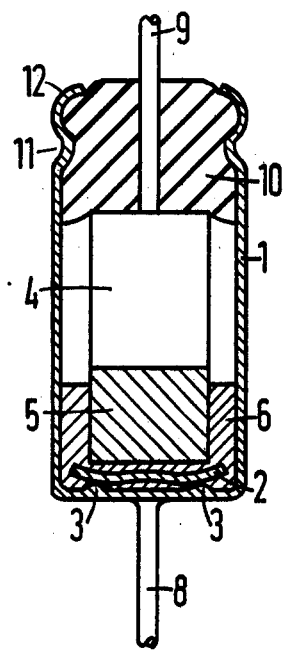
FIG. 2 illustrates a solid electrolytic capacitor which is mounted in a housing which is sealed with a rubber plug.

In FIG. 1 it is apparent that a solderable metal part 2 such as a copper wire or a small copper disk is welded to points 3 on a base of an aluminum cup 1. A tantalum solid electrolytic capacitor 4, whose cathode current terminal consists of a solderable coating 5, is mounted within the housing 1. The solderable coating 5 can consist of a layer of conductive silver lacquer, for example, which is shown in FIGS. 1 and 2 in cross-hatching for better illustration. For installation of the capacitor 4, a soft solder 6 is placed into the housing 1 in the required quantity and is then liquefied there by heating. However, the solder 6 in liquefied form can also be poured into the housing 1. Capacitor 4, with its solderable coating 5, which, if necessary has been preheated, is dipped into the solder 6. During cooling, the solder 6 solidifies and thus produces the electrical connection between the cathode current terminal 5 and the aluminum cup via the solderable metal part 2. After cooling, the cup 1 is sealed by a liquid sealing resin 7, such as an epoxy resin. A cathode connecting wire 8 consisting of, for instance, tinned copper, is mounted on an outside surface of the cup base. The anode connecting wire 9, which can consist of, for instance, nickel, is guided out from the cup and electrically insulated therefrom.

In the embodiment illustrated in FIG. 2, a solid electrolytic capacitor 4 is mounted within a metal housing 1, and is sealed therein by a rubber stopper 10 which is rigidly connected to the housing 1 by means of flanging 12 and a circuit reinforcing crimp 11. The remaining reference numerals agree with those of FIG. 1.

In addition to the installation of a tantalum solid electrolytic capacitor illustrated in the drawing, the invention can, of course, be applied to other electrical components in which one current connection is produced via a solderable coating, or in which a connecting wire is typically soldered to the metal housing.

Although various minor modifications may be suggested by those versed in the art, it should be understood that we wish to embody within the scope of the patent warranted herein, all such embodiments as reasonably and properly come within the scope of our contribution to the art.

We claim as our invention:

1. In an electrical component comprising: an electrical component element mounted in a cup shaped housing, said component element having an electrical terminal which is electrically connected to said housing via a soft solder, the improvement which comprises providing a soft-solderable metal part welded to the inside of said housing and electrically connected by said soft solder to said electrical terminal, said housing comprising a non-soft-solderable metal having at least some aluminum therein, and a terminal lead separate from said soft-solderable metal part, said terminal lead connected to the outside of said housing.

2. The component of claim 1 in which said metal element is entirely aluminum.

3. The component of claim 1 in which the electrical component is a solid electrolytic capacitor.

4. The component of claim 1 in which said component element has a second terminal comprising a wire protruding from said housing, a sealing means being provided adjacent said second terminal.

5. The component of claim 1 in which said component element comprises a solid electrolytic tantalum capacitor.

6. The electrical component of claim 1, characterized in that said housing is an aluminum cup having a base, and that said solderable metal part is welded to said base.

7. An electrical component comprising:
(a) A component element having at least one terminal;
(b) a cup shaped component housing of a non-soft-solderable metal, said housing having a soft-solderable metal part welded on the inside thereof;
(c) a soft solder in said component housing in electrical contact with said one terminal and said soft-solderable metal part; and
(d) a terminal wire separate from said soft-solderable metal part, said terminal wire connected to said housing on an outside surface thereof.

* * * * *